US008463608B2

(12) United States Patent
Dow et al.

(10) Patent No.: US 8,463,608 B2
(45) Date of Patent: *Jun. 11, 2013

(54) INTERACTIVE SPEECH RECOGNITION MODEL

(75) Inventors: Barry Neil Dow, Gosport (GB); Eric William Janke, Winchester (GB); Daniel Lee Yuk Cheung, Basingstoke (GB); Benjamin Terrick Staniford, Wallasey (GB)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,824

(22) Filed: Mar. 12, 2012

(65) Prior Publication Data

US 2012/0173237 A1 Jul. 5, 2012

Related U.S. Application Data

(63) Continuation of application No. 10/953,712, filed on Sep. 29, 2004, now Pat. No. 8,160,876.

(51) Int. Cl.
*G10L 15/06* (2006.01)

(52) U.S. Cl.
USPC ........... 704/244; 704/246; 704/247; 704/251; 704/252

(58) Field of Classification Search
None
See application file for complete search history.

(56) References Cited

U.S. PATENT DOCUMENTS

| 6,035,273 | A | 3/2000 | Spies |
| 6,185,527 | B1 | 2/2001 | Petkovic et al. |
| 6,185,532 | B1 | 2/2001 | Lemaire et al. |
| 6,363,348 | B1 | 3/2002 | Besling et al. |
| 6,442,519 | B1 | 8/2002 | Kanevsky et al. |
| 6,463,413 | B1 | 10/2002 | Applebaum et al. |
| 6,747,685 | B2 | 6/2004 | Taib et al. |
| 6,785,647 | B2 | 8/2004 | Hutchison |
| 6,816,834 | B2 | 11/2004 | Jaroker |
| 7,224,981 | B2 | 5/2007 | Deisher et al. |
| 7,548,985 | B2 | 6/2009 | Guigui |
| 2002/0059068 | A1* | 5/2002 | Rose et al. .................... 704/246 |
| 2002/0091511 | A1* | 7/2002 | Hellwig et al. ............... 704/201 |
| 2002/0091527 | A1 | 7/2002 | Shiau |
| 2003/0050783 | A1* | 3/2003 | Yoshizawa ................. 704/270.1 |
| 2003/0195751 | A1 | 10/2003 | Schwenke et al. |
| 2006/0206333 | A1 | 9/2006 | Paek et al. |
| 2009/0043582 | A1 | 2/2009 | Zhou et al. |

* cited by examiner

*Primary Examiner* — Leonard Saint Cyr
(74) *Attorney, Agent, or Firm* — Wolf, Greenfield & Sacks, P.C.

(57) ABSTRACT

A method and apparatus for updating a speech model on a multi-user speech recognition system with a personal speech model for a single user. A speech recognition system, for instance in a car, can include a generic speech model for comparison with the user speech input. A way of identifying a personal speech model, for instance in a mobile phone, is connected to the system. A mechanism is included for receiving personal speech model components, for instance a BLUETOOTH connection. The generic speech model is updated using the received personal speech model components. Speech recognition can then be performed on user speech using the updated generic speech model.

18 Claims, 3 Drawing Sheets

INTERACTIVE SPEECH RECOGNITION MODEL

RELATED APPLICATIONS

This application is a continuation of and claims the benefit under 35 U.S.C. §120 of U.S. patent application Ser. No. 10/953,712, which was filed in the U.S. Patent and Trademark Office on Sep. 29, 2004, which claims the benefit of British Patent Application No. 0329761.1, filed on Dec. 23, 2003, and which is herein incorporated by reference in its entirety.

This invention relates to a method and apparatus for updating a generic speech model on a multi-user interactive speech recognition system.

BACKGROUND

A speech recognition engine is a speech controlled interface providing a useful and sometimes improved means for controlling and inputting data to existing computer applications. An essential part of a speech recognition engine is a speech model comprising a language model (words) and an acoustic model (basic sound units). Words in the language model are formed from combinations of the basic sound units defined in the acoustic model. Each basic sound unit represents electronic characteristics of speech input over a sample period. A speech recognition engine receives speech samples and matches them with the basic sound units in the acoustic model. The speech recognition engine then calculates the most likely words from the language model based on the matched basic sound units.

Two distinct types of speech recognition in this specification are personal speech recognition and generic speech recognition. A personal speech recognition system, for instance a mobile phone speech recognition system, is characterized in that the personal speech model used is specific to the user and has been adapted by the user through training. Initial training is performed during a first use of the personal system and training continues during normal use of the personal system. A personal speech model comprises unique sets of electronic characteristics for the acoustic model and a unique language model for the words formed from combinations of unique basic sound units. A shared speech recognition system for example for a car or telephony system uses a generic speech model comprising averages of language and acoustic models collected from a large sample of users. Generic speech recognition can use generic speech models because it typically has more powerful memory and processing resources at its disposal and can store and process much greater volumes of data than a personal system.

A known generic speech recognition system in a telephony interactive voice response system (IVR) stores personal speech models where each personal speech model is selected based on the telephone number of the user and each personal speech model is trained by the user. But training is not a desired feature of IVRs as telephony users are not as technically tolerant as personal speech recognition users and they demand seamless speech recognition or no speech recognition at all. Moreover telephony speech recognition users would not like to train both a personal speech model on a desktop and a generic speech model on a shared IVR.

It would be advantageous to have a generic speech model in an IVR that benefits from personal speech models.

SUMMARY OF INVENTION

According to a first aspect of the present invention there is provided a speech recognition system including a generic speech model for speech recognition of user speech input, and means for identifying a personal speech model connected to the system. Further provided is means for receiving personal speech model components. Means for updating the generic speech model using the received personal speech model components, and means for performing speech recognition on user speech using the updated generic speech model are also provided.

Such a system combines the generic speech model with components of a personal speech model.

Advantageously the means for receiving speech model components retrieves the components from a personal device connected to the system. In this way speech applications on the personal device and speech applications on the speech recognition system have access to the same speech model components without an intermediary. However, in some arrangements the personal device may not necessarily be enabled to execute voice applications but could simply store the personal speech model.

One problem encountered with updating a generic speech model is that the amount of data in the speech model can be so large as to delay the recognition process. In order to address this problem the system can preferably further comprise means for identifying a system application to be used by the user. In addition, means for identifying a list of possible words used in response to the system application can be provided. The means for receiving speech model components may only receive speech model components associated with words from the possible word list.

Alternatively and advantageously the means for receiving speech model components retrieves them from a speech model server. A central speech model server can ensure compatibility between the personal speech model and the generic speech model of the system. Although storing the personal speech model on a server and on the personal device are alternatives, it is also possible to store the personal speech model on both the server and the personal device. Speech model components stored on the personal device can be periodically synchronized with speech model components stored on the speech model server. In this way the user takes advantage of the large processing power of speech recognition system and a personalized speech model.

DESCRIPTION OF DRAWINGS

In order to promote a fuller understanding of this and other aspects of the present invention, an embodiment of the invention will now be described, by means of example only, with reference to the accompanying drawings in which.

DESCRIPTION OF THE EMBODIMENTS

Figure 1:
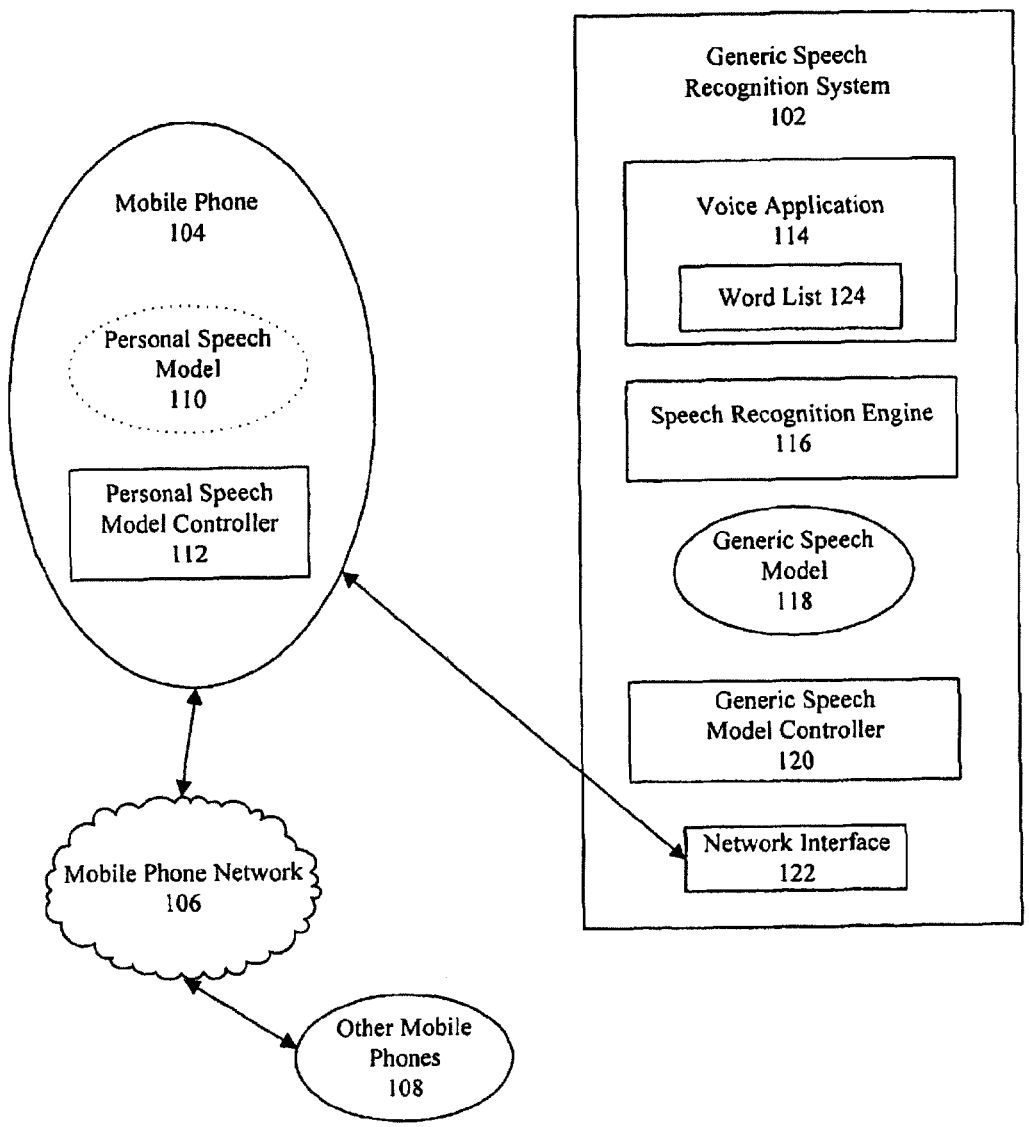
FIG. 1 is a schematic diagram of the preferred embodiment of the invention including a generic speech model and a generic speech model controller.

Referring to FIG. 1 there is shown a speech recognition system 100 according to an arrangement of the present invention. The system environment 100 comprises a generic speech recognition system 102 in a car connected to a personal speech recognition system in a personal device such as a mobile phone 104 via a personal network (not shown) such as for example a BLUETOOTH® network. The mobile phone 104 also connects to a mobile phone network 106 that further connects to other mobile phones 108.

The mobile phone 104 can include: a personal speech model 110 and a personal speech model controller 112. The personal speech model controller 112 can create, use and modify the personal speech model 110 during training when the user is running a personal speech recognition application (not shown) for input or control of the mobile phone 104. The personal speech model controller 112 sends components of the personal speech model 110 on request to the generic speech recognition system 102.

The generic speech recognition system 102 can comprise: a voice application 114; a speech recognition engine 116; a generic speech model 118; a generic speech model controller 120 and a network interface 122.

The voice application 114 includes an embedded word list 124 comprising possible words which might be used in response to the voice application 114. The voice application 114 can be written in VoiceXML although Java or state tables may also be used. XML tags are used to list the possible words.

The speech recognition engine 116 uses the generic speech model 118 to perform recognition for the voice application 114. Typically the voice application 114 will prompt the user for input and then request speech recognition on the input. The speech input can include: data for the application such as a destination in the case of a route planning application; and also instructions for the application such as options in a menu or 'yes'/'no' answers to voice application questions. Whatever the speech input, the speech recognition engine 116 samples the voice input and compares the samples with the generic speech model 118 to find the most probably word matches.

Generic speech model 118 is described in relation to FIG. 2 below.

Generic speech model controller 120 is described in relation to FIG. 3 below.

The network interface 122 communicates with the mobile phone via the computer network.

Figure 2:
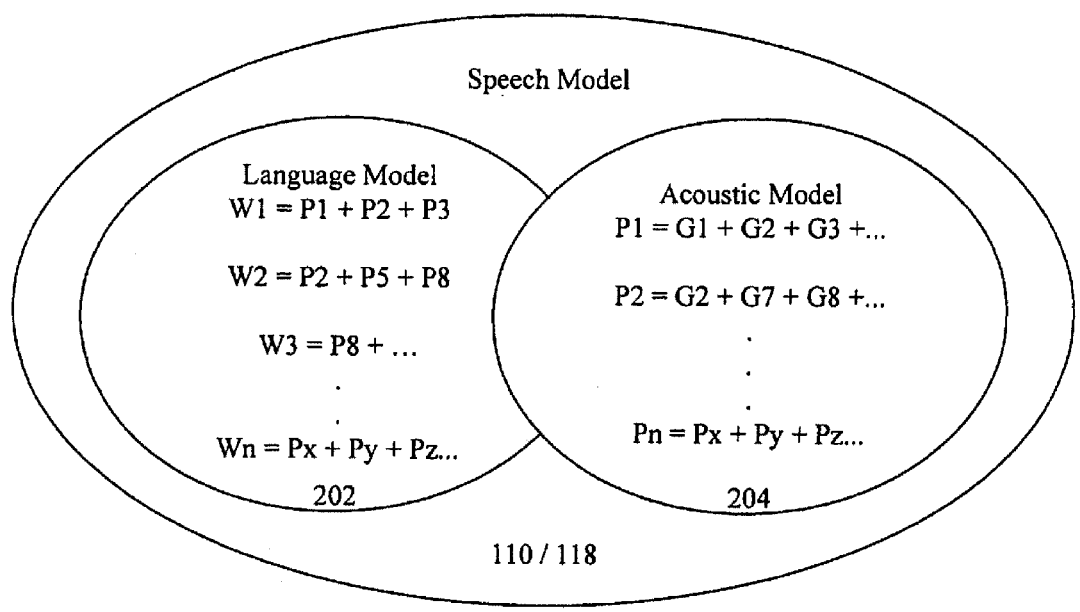
FIG. 2 is a schematic diagram of a speech model of the preferred embodiment of the invention.

Referring to FIG. 2, a speech model (110 or 118) of the preferred embodiment of the invention can comprise: a language model 202 and an acoustic model 204. FIG. 2 and following descriptions apply to both the generic speech model 118 and personal speech model 110.

The language model 202 comprises a subset of all the words in the language, usually those words most likely to be used in any application or those words which have been used in training the language model 126. Each word comprises basic sound units. For instance, in FIG. 2, the first word (W1) comprises first, second and third basic sound units (P1+P2+P3); the second word (W2) comprises the second, fifth and eighth basic sound units (P2+P5+P8); and the nth word (Wn) comprises another unspecified combination of sounds units (Px+Py+Pz). The speech model 110/118 can comprise anything from tens to thousands of such word combinations. Each word may have a unique combination or several combinations of basic sound units.

The acoustic model 204 comprises all the basic sound units of the language model 202, with each basic sound unit comprising a sample of electronic characteristics in time for a speech signal. For instance: a first sound unit (P1) comprises a first, second and third electronic characteristic (G1+G2+G3); a second sound unit (P2) comprises a second, seventh and eight electronic characteristic (G2+G7+G8); and an nth basic sound unit (Pn) comprises an unspecified combination of electronic characteristics (Px+Py+Pz).

Figure 3:
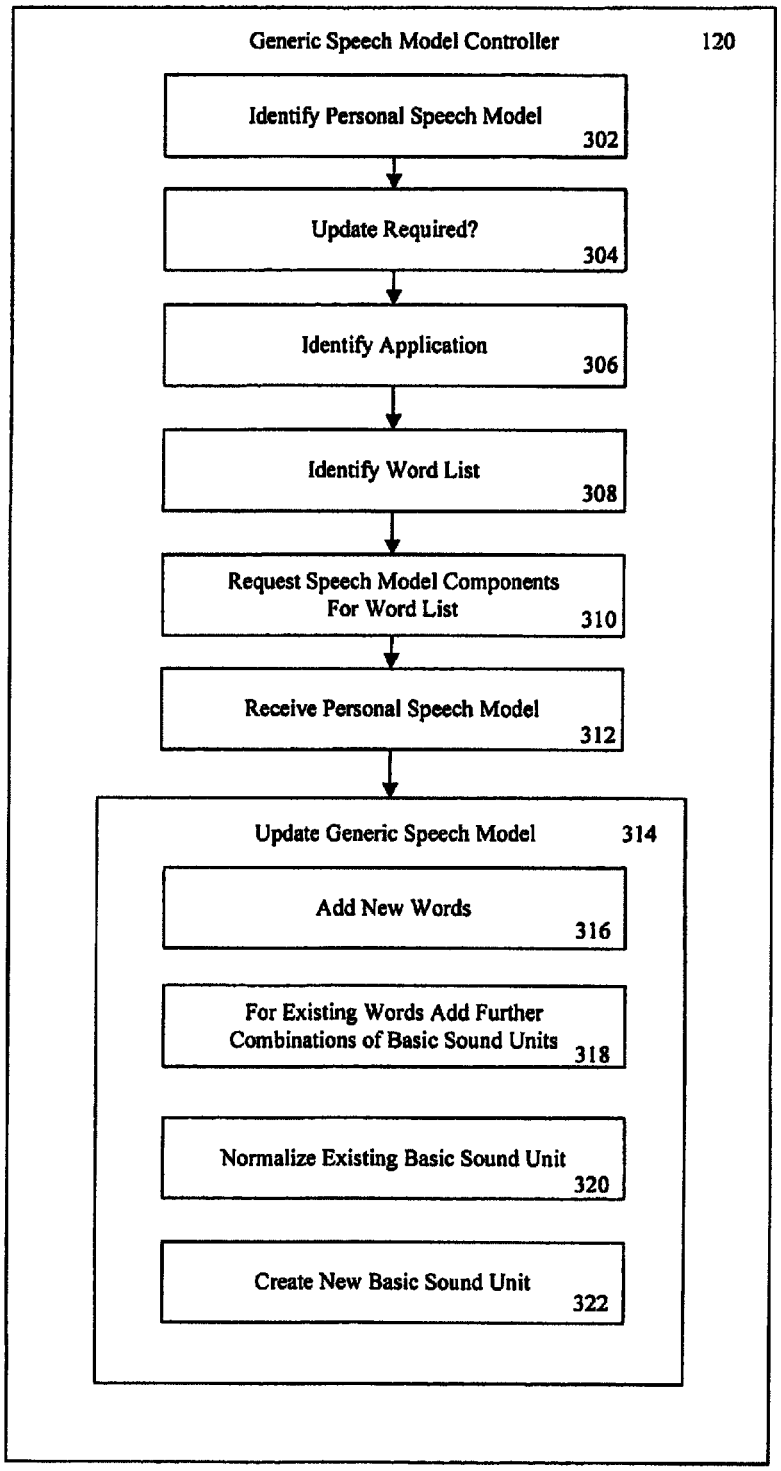
FIG. 3 is a schematic diagram of the generic speech model controller of the preferred embodiment of the invention.

Referring to FIG. 3, the generic speech model controller 120 can comprise the following methods: identify personal speech model 302; update required 304; identify application 306; identify word list 308; request speech model components for word list 310; receive personal speech model 312; and update generic speech model 314. The update generic speech model method 314 can comprise the following sub-methods: add new words 316; add further combinations of basic sound units for existing words 318; normalize existing basic sound units 320; and create new basic sound unit 322.

The generic speech model controller 120 identifies (method 302). The personal speech model 110 by querying the mobile phone 104 after network connection between the mobile phone 104 and the generic speech recognition system 102.

The generic speech model controller 120 checks whether an update is required (method 304) by looking up a system variable to see if the generic speech model has been updated by the personal speech model before. If there has been no previous update then the process can continue with method 306. Otherwise, the process halts and the generic speech model is not updated again.

The generic speech model controller 120 identifies (method 306) the voice application file names associated with the generic speech recognition system 102 from system variables.

The generic speech model controller 120 can use the voice application file names to query the voice application 114 directly and identify (method 308) the words associated with it. The word list 124 associated with voice application 114 can be embedded within the voice application 114 or stored as a separate file associated with the voice application file name.

The generic speech model controller 102 requests (method 310) speech model components associated with words in the word list 124. The language model components associated with the words in the word list 124 and the associated acoustic model components are identified by the personal speech model controller and sent back in response. The components are received by the generic speech model controller 120.

The generic speech controller 120 then uses the personal speech model components to update (method 314) the generic speech model 118. New language model components can be added (method 316) to the generic language model 120. For coexisting words in the personal and generic language model, further combinations of basic sound units from the personal language model can be added (method 318) to those coexisting words in the generic language model 118. For coexisting basic sound units, the basic sound units in the generic acoustic model are normalized (method 320) with those of the personal acoustic model. New basic sound units in the personal acoustic model can be added (method 322) to the generic acoustic model.

An example of the use of the embodiment will now be described. A user gets into his car and a connection is made between his BLUETOOTH car generic speech recognition system 102 and his BLUETOOTH personal mobile phone 104. The generic speech recognition system 102 detects (method 302) if the mobile phone 104 has a personal speech model 110 (which it has in this example). The generic speech model 118 is queried to see if an update is required (method 304) (which in this example it is since no updates have been made before). Then the route planning application is identified (method 306) and the word list 124 for the route planning application is identified (method 308). In this case the names of all the towns and street names in the UK are identified for the route planning application. The mobile phone 104 is requested (method 310) to send speech model components for any of the towns and street names located. Once received (method 312) the generic speech model 118 is updated (method 314). Any new towns or street names are added (method 316) to the generic language model. For all existing towns or street names in the generic language model new combinations of basic sound units are added (method 318). All existing basic sound units for the identified towns and street names are normalized (method 320). Any new basic sounds for towns or street names are added (method 322) to the generic acoustic model.

Although the preferred embodiment envisages that the telephone is a mobile phone, in an entirely different embodiment a mobile computer or personal digital assistant (PDA) could be connected to the speech recognition system through the computer network.

The preferred embodiment envisages that the speech recognition system is located in a car. However, it could be, for example, a personal system on a desktop or a telephony interactive voice response system (IVR) on a telephony network.

In another embodiment of the invention a speech model server can store a copy of personal speech models from many mobile phones or mobile devices. The speech model server comprises a server speech model controller and a collection of personal speech models. In this way when a generic telephony IVR has to deal with many personal speech models from different mobile phones and different mobile devices it can deal with a single interface. The server speech model controller is responsible for synchronization and for forwarding components of a particular user speech model to the IVR. BLUETOOTH is a trademark and owned by BLUETOOTH SIG, Inc.

The invention claimed is:

1. A method for updating a first speech model in a speech recognition system, comprising:
   receiving from a user device of a user, the user device comprising a personal speech model trained for the user through previous speech recognition operations, one or more personal speech model components of the personal speech model trained for the user through previous speech recognition operations, the one or more personal speech model components describing personal speech characteristics of the user;
   updating the first speech model using at least some of the one or more personal speech model components, by modifying at least one speech model component of the first speech model and/or adding at least one speech model component to the first speech model; and
   performing speech recognition on user speech using the first speech model updated with the at least some of the one or more personal speech model components.

2. The method of claim 1, wherein the user device is a mobile device.

3. The method of claim 2, wherein the network connection includes a BLUETOOTH® connection between the mobile device and the speech recognition system.

4. The method of claim 3, wherein the speech recognition system is part of a navigation system located in a vehicle.

5. The method of claim 1, wherein the personal speech model components are personal language model components.

6. The method of claim 1, wherein the personal speech model components are personal acoustic model components.

7. At least one non-transitory computer readable medium encoded with instructions that, when executed on at least one computer, performs a method for updating a first speech model in a speech recognition system, comprising:
   receiving, from a user device of a user, the user device comprising a personal speech model trained for the user through previous speech recognition operations, one or more personal speech model components of the personal speech model trained for the user through previous speech recognition operations, the one or more personal speech model components describing personal voice characteristics of the user;
   updating the first speech model using at least some of the one or more personal speech model components, by modifying at least one speech model component of the first speech model and/or adding at least one speech model component to the first speech model; and
   performing speech recognition on user speech using the first speech model updated with the at least some of the one or more personal speech model components.

8. The at least one non-transitory computer readable medium of claim 7, wherein the user device is a mobile device.

9. The at least one non-transitory computer readable medium of claim 8, wherein the network connection includes a BLUETOOTH® connection between the mobile device and the speech recognition system.

10. The at least one non-transitory computer readable medium of claim 9, wherein the speech recognition system is part of a navigation system located in a vehicle.

11. The at least one non-transitory computer readable medium of claim 7, wherein the personal speech model components are personal language model components.

12. The at least one non-transitory computer readable medium of claim 7, wherein the personal speech model components are personal acoustic model components.

13. A speech recognition system accessible over a network, comprising:
   a first speech model;
   at least one processor programmed to implement a speech recognition engine capable of recognizing speech data based, at least in part, on the first speech model; and
   a speech model controller to;
   receive, from a user device of a user, the user device comprising a personal speech model trained for the user through previous speech recognition operations, one or more personal speech model components of the personal speech model trained for the user through previous speech recognition operations, the one or more personal speech model components describing personal voice characteristics of the user;
   update the first speech model using at least some of the one or more personal speech model components, by modifying at least one speech model component of the first speech model and/or adding at least one speech model component to the first speech model; and
   transmit user speech to be recognized by the speech recognition engine using the first speech model updated with the at least some of the one or more personal speech model components.

14. The speech recognition system of claim 13, wherein the user device is a mobile device.

15. The speech recognition system of claim 14, wherein the network connection includes a BLUETOOTH® connection between the mobile device and the speech recognition system.

16. The speech recognition system of claim 15, wherein the speech recognition system is part of a navigation system located in a vehicle.

17. The speech recognition system of claim 13, wherein the personal speech model components are personal language model components.

18. The speech recognition system of claim 13, wherein the personal speech model components are personal acoustic model components.

\* \* \* \* \*